(12) United States Patent
Song et al.

(10) Patent No.: US 11,024,909 B2
(45) Date of Patent: Jun. 1, 2021

(54) SECONDARY BATTERY HAVING A CASE INCLUDING A LIQUID-PHASE SHORT-CIRCUIT PREVENTION LAYER

(71) Applicant: LG Chem, Ltd., Seoul (KR)

(72) Inventors: Jooyong Song, Daejeon (KR); Myung Ki Lee, Daejeon (KR); Hee Seok Jeong, Daejeon (KR); Ji Hee Ahn, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 15/750,665

(22) PCT Filed: Aug. 22, 2017

(86) PCT No.: PCT/KR2017/009145
§ 371 (c)(1),
(2) Date: Feb. 6, 2018

(87) PCT Pub. No.: WO2018/052199
PCT Pub. Date: Mar. 22, 2018

(65) Prior Publication Data
US 2020/0013996 A1    Jan. 9, 2020

(30) Foreign Application Priority Data

Sep. 13, 2016   (KR) .................. 10-2016-0118175

(51) Int. Cl.
*H01M 50/124*    (2021.01)
*H01M 10/0525*   (2010.01)
(Continued)

(52) U.S. Cl.
CPC ..... *H01M 50/124* (2021.01); *H01M 10/0525* (2013.01); *H01M 50/116* (2021.01); *H01M 50/126* (2021.01); *H01M 2200/00* (2013.01)

(58) Field of Classification Search
CPC .. H01M 2/0287; H01M 2/0285; H01M 2/028; H01M 2/0275; H01M 10/0525;
(Continued)

(56) References Cited

U.S. PATENT DOCUMENTS

| 9,337,454 B2 | 5/2016 | Yokoyama et al. |
| 2013/0040173 A1 | 2/2013 | Yokoyama et al. |

(Continued)

FOREIGN PATENT DOCUMENTS

| CN | 102859750 A | 1/2013 |
| CN | 103682188 A | 3/2014 |

(Continued)

OTHER PUBLICATIONS

Search report from International Application No. PCT/KR2017/009145, dated Nov. 24, 2017.

(Continued)

*Primary Examiner* — Kwang Han
(74) *Attorney, Agent, or Firm* — Lerner, David, Littenberg, Krumholz & Mentlik, LLP

(57) ABSTRACT

The present invention relates to a secondary battery that is capable of preventing short circuit from occurring when a nail test is performed.
Also, the secondary battery includes a case accommodating an electrolyte and an electrode assembly therein, and the case includes an external layer exposed to the outside, an internal layer disposed in the case, and a short-circuit prevention layer provided in a liquid phase between the external layer and the internal layer.

2 Claims, 5 Drawing Sheets

(51) Int. Cl.
*H01M 50/116* (2021.01)
*H01M 50/126* (2021.01)

(58) Field of Classification Search
CPC ........... H01M 2200/00; H01M 50/124; H01M 50/116; H01M 50/126; Y02E 60/10
See application file for complete search history.

(56) References Cited

U.S. PATENT DOCUMENTS

| | | |
|---|---|---|
| 2014/0377636 A1 | 12/2014 | Sung et al. |
| 2017/0155102 A1 | 6/2017 | Chung et al. |

FOREIGN PATENT DOCUMENTS

| | | | | |
|---|---|---|---|---|
| CN | 104040752 A | | 9/2014 | |
| CN | 103325987 B | * | 8/2015 | ............. H01M 2/34 |
| CN | 105470415 A | | 4/2016 | |
| JP | S46003625 Y | | 2/1971 | |
| JP | H1167168 A | | 3/1999 | |
| JP | H1167168 A | * | 3/1999 | ........... Y02E 60/122 |
| JP | 2014060012 A | | 4/2014 | |
| KR | 20110024114 A | | 3/2011 | |
| KR | 20130126106 A | | 11/2013 | |
| KR | 101495953 B1 | | 2/2015 | |
| KR | 20150037392 A | | 4/2015 | |
| KR | 20150038931 A | | 4/2015 | |
| KR | 20150063726 | | 6/2015 | |
| KR | 20150134086 A | | 12/2015 | |
| KR | 101637896 B1 | | 7/2016 | |
| WO | 2012073432 A1 | | 6/2012 | |

OTHER PUBLICATIONS

Extended European Search Report including Written Opinion for Application No. EP17835990.7 dated Aug. 7, 2019.
Chinese Search Report for Application No. 201780002929.X dated May 28, 2020, 2 pages.
Search Report from Chinese Office Action for Application No. 201780002929.X dated Jan. 4, 2021; 2 pages.
Zhong Liang Dong et al., "New Energy Material and Its Application", National Defense Industry Press, Beijing, China, p. 176, Jan. 31, 2008.

* cited by examiner

SECONDARY BATTERY HAVING A CASE INCLUDING A LIQUID-PHASE SHORT-CIRCUIT PREVENTION LAYER

CROSS-REFERENCE TO RELATED APPLICATION

The present application is a national phase entry under 35 U.S.C. § 371 of International Application No. PCT/KR2017/009145, filed Aug. 22, 2017, which claims the benefit of the priority of Korean Patent Application No. 10-2016-0118175, filed on Sep. 13, 2016, the disclosures of which are hereby incorporated herein by reference in their entireties.

TECHNICAL FIELD

The present invention relates to a secondary battery, and more particularly, to a secondary battery that is capable of preventing short circuit from occurring when a nail test is performed.

BACKGROUND ART

Batteries (cells) that generate electric power through physical or chemical reaction to supply the generated power to the outside are used when AC power to be supplied to the building is not obtained, or DC power is required according to the living environments surrounded by various electric and electronic devices.

Among such batteries, primary batteries and secondary batteries, which are chemical batteries using chemical reaction, are being generally used. The primary batteries are consumable batteries which are collectively referred to as dry batteries. Also, secondary batteries are rechargeable batteries that are manufactured by using a material in a redox process between current and a substance is repeatable several times. When the reduction reaction is performed on the material by the current, power is charged, and when the oxidation reaction is performed on the material, power is discharged. Such the charging-discharging is repeatedly performed to generate electricity.

A lithium ion battery of the secondary batteries is manufactured through the following processes. An active material is applied to each of a positive electrode conductive foil and a negative electrode conductive foil at a predetermined thickness, and a separator is disposed between the positive electrode conductive foil and the negative electrode conductive foil, and then, an electrode assembly, in which the positive electrode conductive foil, the separator, and the negative electrode conductive foil are wound several times in a jelly-roll or cylindrical shape, is accommodated into a cylindrical or prismatic can, a pouch, and the like to seal the resultant product, thereby manufacturing the lithium ion battery.

A pouch material having a heat-contracting resin layer is disclosed in Korean Utility Model Registration No. 20-0214033.

FIG. 1 is a partial cutaway enlarged view of a layer structure in which a portion of a pouch material having a contractive resin layer is cut to constitute a pouch according to a related art.

As illustrated in FIG. 1, a pouch for a secondary battery according to the related art is manufactured by sequentially stacking polypropylene 10, aluminum 20, nylon 30, and polyethylene terephthalate 40.

However, the pouch for the secondary battery according to the related art has a problem in which, when a nail passes through the pouch to penetrate an electrode assembly within the pouch while a nail test is performed, short circuit occurs between a positive electrode and a negative electrode within the electrode assembly to cause ignition of the electrode assembly due to heat.

DISCLOSURE OF THE INVENTION

Technical Problem

Therefore, the present invention has been made to solve the abovementioned problem, and an object of the present invention is to provide a secondary battery that is capable of preventing short circuit from occurring between a positive electrode and a negative electrode of an electrode assembly when a nail test is performed.

Technical Solution

A secondary battery according to an embodiment of the present invention includes a case accommodating an electrolyte and an electrode assembly therein, wherein the case includes an external layer exposed to the outside, an internal layer disposed in the case, and a short-circuit prevention layer provided in a liquid phase between the external layer and the internal layer.

The short-circuit prevention layer may include an oil layer containing an oil.

The oil may include an insulation oil.

The external layer may be made of polyethylene terephthalate (PET).

An aluminum layer may be disposed between the external layer and the short-circuit prevention layer.

The secondary battery may further include an adhesion layer disposed between the aluminum layer and the external layer and provided as an adhesion member that allows the aluminum layer to adhere to the external layer.

The internal layer may be made of polypropylene (PP).

Advantageous Effects

According to the present invention, it may be effective to ensure the safety when the nail test is performed.

According to the present invention, the short circuit due to the damage or impact may be prevented from occurring to minimize the possibility of the ignition.

MODE FOR CARRYING OUT THE INVENTION

Figure 1:
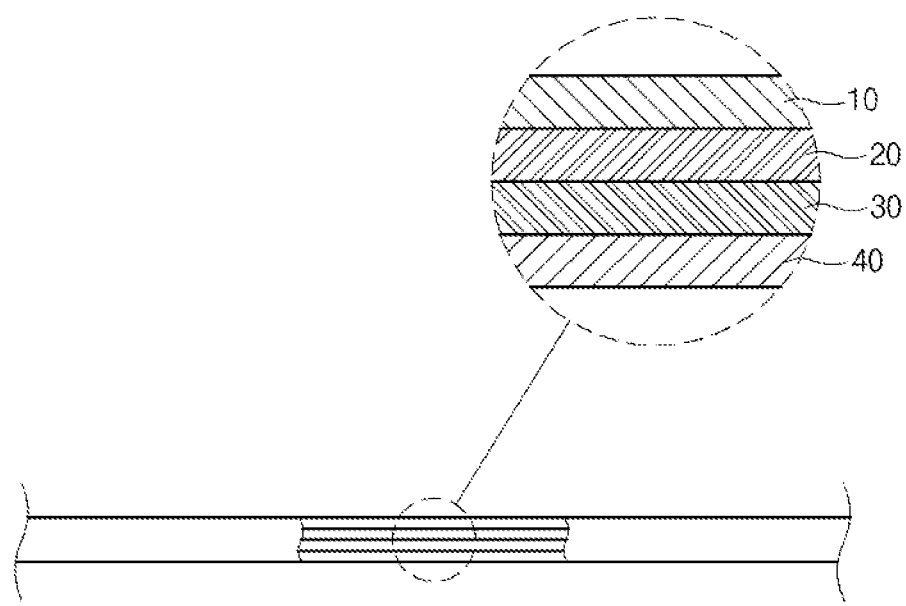
FIG. 1 is a partial cutaway enlarged view of a layer structure in which a portion of a pouch material having a contractive resin layer is cut to constitute a pouch according to a related art.

Hereinafter, a secondary battery according to a preferred embodiment of the present invention will be described in detail with reference to the accompanying drawings.

Terms or words used in the specification and claims should not be construed as limited to a lexical meaning, and should be understood as appropriate notions by the inventor based on that he/she is able to define terms to describe his/her invention in the best way to be seen by others. Therefore, embodiments and drawings described herein are simply exemplary and not exhaustive, and it will be understood that various equivalents may be made to take the place of the embodiments.

In the drawings, the dimension of each of components or a specific portion constituting the component is exaggerated, omitted, or schematically illustrated for convenience in description and clarity. Thus, the dimension of each element does not entirely reflect an actual size. Moreover, detailed descriptions related to well-known functions or configurations will be ruled out in order not to unnecessarily obscure subject matters of the present invention.

Figure 2:
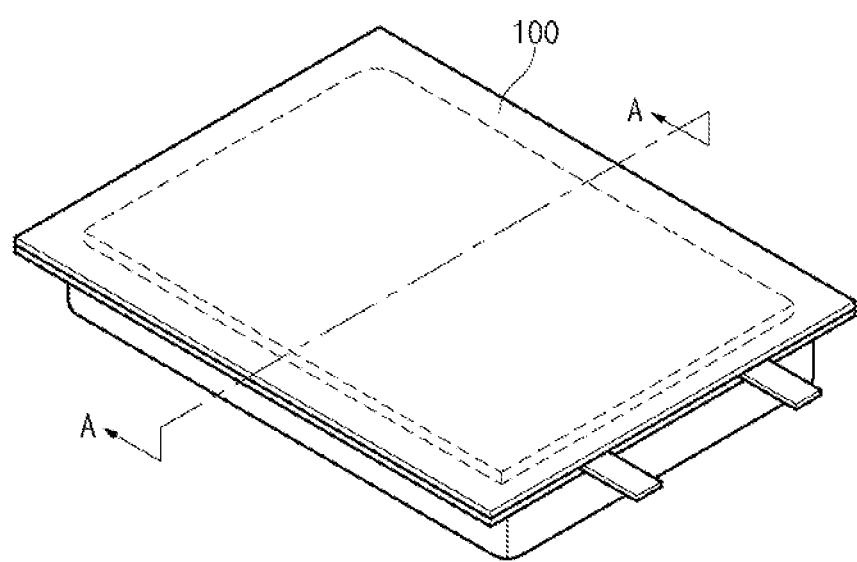
FIG. 2 is a perspective view of a secondary battery according to an embodiment of the present invention.
Figure 3:
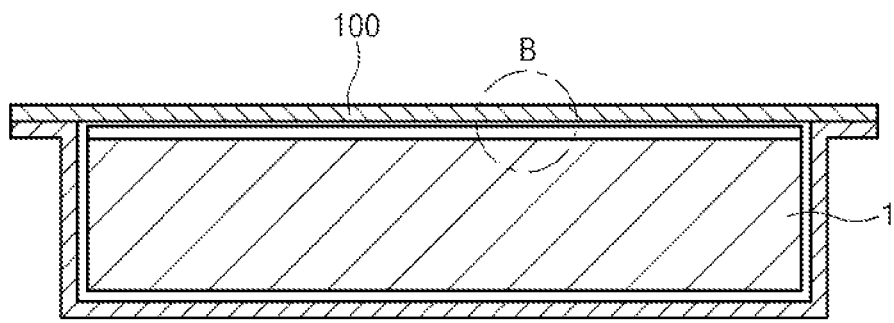
FIG. 3 is a cross-sectional view taken along line A-A of FIG. 2.
Figure 4:
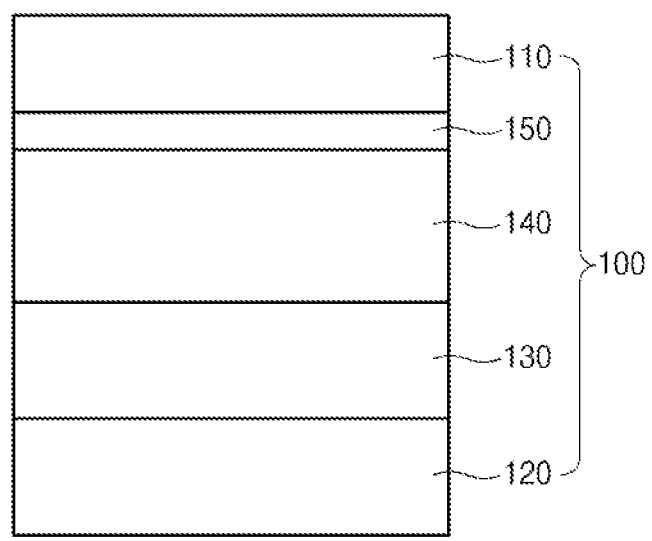
FIG. 4 is a partial enlarged cross-sectional view illustrating a portion "B" of a case of FIG. 3.

FIG. 2 is a perspective view of a secondary battery according to an embodiment of the present invention, FIG. 3 is a cross-sectional view taken along line A-A of FIG. 2, and FIG. 4 is a partial enlarged cross-sectional view illustrating a portion "B" of a case of FIG. 3.

As illustrated in FIGS. 2 to 4, a secondary battery according to an embodiment of the present invention includes a case 100 that accommodates an electrolyte and an electrode assembly 1 therein. The case 100 includes an external layer 110 exposed to the outside, an internal layer 120 disposed in the case 100, and a short-circuit prevention layer 130 provided in a liquid phase between the external layer 110 and the internal layer 120.

The electrode assembly 1 may be manufactured by stacking a positive electrode coated with a positive electrode active material, a negative electrode coated with a negative electrode active material, and a separator disposed between the positive electrode and the negative electrode several times.

Also, the electrode assembly 1 may be manufactured by winding the stack, in which the positive electrode, the separator, and the negative electrode are stacked, in a jelly-roll shape.

The positive electrode may be an aluminum plate and include a positive electrode coating portion coated with the positive electrode active material and a positive electrode non-coating portion which is not coated with the positive electrode active material.

The positive electrode active material may include a lithium-containing transition metal oxide such as $LiCoO_2$, $LiNiO_2$, $LiMnO_2$, and $LiMnO_4$ or a lithium chalcogenide compound.

The positive electrode coating portion may be formed, for example, by applying the positive electrode active material to a portion of at least one surface of the aluminum plate, and the remaining portion of the aluminum plate, which is not coated with the positive electrode active material, may be the positive electrode non-coating portion.

A positive electrode tab may be attached to the positive electrode non-coating portion.

The negative electrode may be a copper plate and include a negative electrode coating portion coated with the negative electrode active material and a negative electrode non-coating portion which is not coated with the negative electrode active material.

A negative electrode tab may be attached to the negative electrode non-coating portion.

The negative electrode active material may be a carbon material such as crystalline carbon, amorphous carbon, a carbon composite, and a carbon fiber, a lithium metal, or a lithium alloy.

The negative electrode coating portion may be formed, for example, by applying the negative electrode active material to a portion of at least one surface of the copper plate, and the remaining portion of the copper plate, which is not coated with the negative electrode active material, may be the negative electrode non-coating portion.

The separator may be manufactured by applying a polyvinylidene fluoride-hexafluoropropylene copolymer (PVDF-HFP co-polymer) to one base material selected from the group consisting of, for example, polyethylene (PE), polystyrene (PS), polypropylene (PP), and a copolymer of polyethylene (PE) and polypropylene.

The electrolyte may allow lithium ions to smoothly move in the electrode assembly. For example, the electrolyte may include a non-aqueous organic solvent and lithium salts.

The lithium salts may be dissolved in the organic solvent to act as a supply source of the lithium ions in the secondary battery and promote the movement of the lithium ions between the positive electrode and the negative electrode.

Exemplary examples of the lithium salts may include electrolytic salts that support one or more kinds of materials selected from $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_4$, $LiAlCl_4$, $LiN(CxF_{2x+1}SO_2)(CyF_{2y+1}SO_2)$(where x and y are natural numbers), LiCl, LiI, lithium bisoxalate borate, and the like.

The lithium salts in the electrolyte may vary in concentration according to a use thereof and may be generally used within a range of 0.1 M to 2.0 M.

Also, the organic solvent serves as a medium through which ions involved in electrochemical reaction of the battery move. Exemplary examples of the organic solvent may include one or more kinds of materials selected from benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (where R is a straight, branched, or cyclic hydrocarbon group having 2 to carbon atoms, wherein the hydrocarbon group includes a double bond, an aromatic ring, or an ether bond), dimethylformamide, dimethylacetate, xylene, cyclohexane, tetrahydrofuran, 2-methyltetrahydrofuran, cyclohexanone, ethanol, isopropyl alcohol, dimethyl carbonate, ethylmethyl carbonate, diethyl carbonate, methyl propyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, gamma-butyrolactone, sulfolane, valerolactone, decanolide, and mevalolactone, but are not limited thereto.

The case 100 may be a can, a pouch, or the like. In the present invention, for convenience of description, the pouch will be described as an example.

The case 100 include the external layer 110 for protecting the electrolyte and the electrode assembly 1, which are accommodated in the case 100, against external environments and the internal layer 120 for preventing the electrolyte and the electrode assembly 1, which are accommodated in the case 100, from leaking or being exposed to the outside.

The external layer 110 may be preferably made of a material having high durability to protect the electrolyte and the electrode assembly 1 against the external environments. For example, the external layer 110 may be made of polyethylene terephthalate (PET).

The internal layer 120 may be preferably made of a material having high insulation so that the internal layer 120 is not deformed or chemically changed in a state in which the internal layer 120 comes into direct contact with the electrolyte accommodated in the case 100. For example, the internal layer 120 may be made of polypropylene (PP).

The short-circuit prevention layer 130 may be an oil layer including an oil such as an insulation oil.

Figure 5:
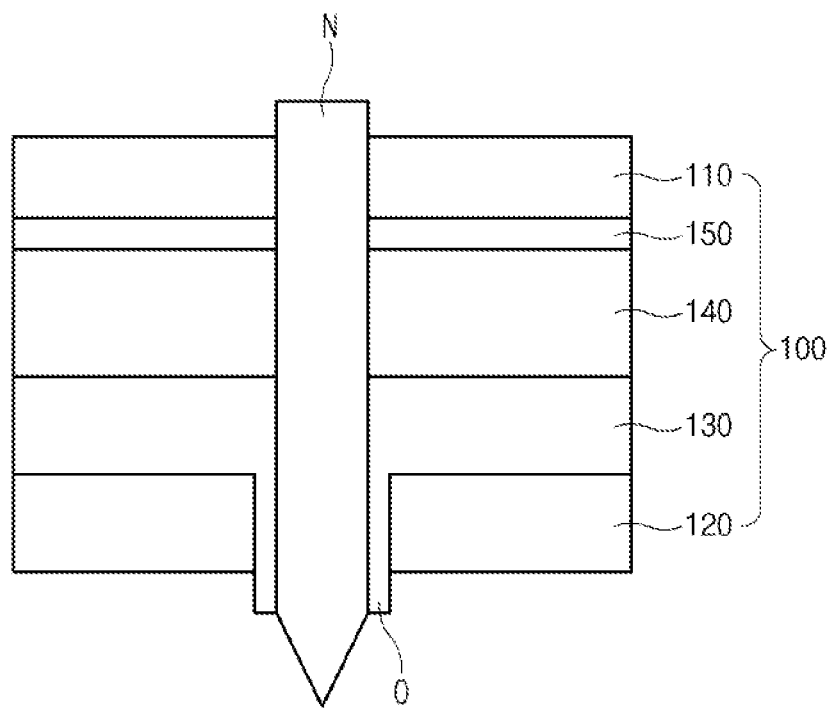
FIG. 5 is a view illustrating a use state in which a nail passes through a pouch to allow an oil of a short-circuit prevention layer to flow along the nail.

FIG. 5 is a view illustrating a use state in which a nail passes through a pouch to allow the oil of the short-circuit prevention layer to flow along the nail.

As illustrated in FIG. 5, the short-circuit prevention layer 130 may be disposed between the external layer 110 and the internal layer 120 in the case 100. Thus, while the nail test is performed, when a nail N passes through the case 100, an oil O of the short-circuit prevention layer 130 may flow along the nail N, and when the nail N passes through the positive electrode and the negative electrode of the electrode assembly 1, the oil O flowing along the nail N may flow into the penetration part of the electrode assembly 1 to prevent the negative electrode and the positive electrode of the electrode assembly 1 from being short-circuited with each other.

That is, the oil O that is the insulation material such as the insulation oil may flow into the penetration part of the electrode assembly 1 to insulation the negative electrode and the positive electrode of the electrode assembly 1 from each other, thereby preventing the short circuit from occurring.

An aluminum layer 140 may be disposed between the external layer 110 and the short-circuit prevention layer 130.

The aluminum layer 140 may be made of an aluminum (Al) material to complement the durability with respect to the outside and complement the insulation and chemical resistance with respect to the inside. Thus, when the external layer 110 or the internal layer 120 is damaged, the aluminum layer 140 may complement safety of the secondary battery.

Also, an adhesion layer 150 may be further disposed between the aluminum layer 140 and the external layer 110.

The adhesion layer 150 may be provided as an adhesion member such as an adhesive to allow the aluminum layer 140 and the external layer 110 to adhere to each other, thereby enhancing the durability of the external layer 110.

As described above, according to the present invention, it may be effective to ensure the safety when the nail test is performed.

Also, according to the present invention, the short circuit due to the damage or impact may be prevented from occurring to minimize the possibility of the ignition.

Although the secondary battery according to the present invention has been described above with reference to the exemplary drawings, various changes and modifications may be made thereto by one skilled in the art without departing from the scope and spirit of the invention as set forth in the appended claims.

The invention claimed is:

1. A secondary battery comprising:
   a case accommodating an electrolyte and an electrode assembly therein,
   wherein the case comprises:
   an external layer exposed to the outside and made of polyethylene terephthalate (PET);
   an internal layer disposed in the case and made of polypropylene (PP);
   an oil layer containing an oil provided in a liquid phase between the external layer and the internal layer;
   an aluminum layer disposed between the external layer and the oil layer; and
   an adhesion layer disposed between the aluminum layer and the external layer and provided as an adhesion member that allows the aluminum layer to adhere to the external layer,
   wherein the oil directly contacts the internal layer and the aluminum layer.

2. The secondary battery of claim 1, wherein the oil comprises an insulation oil.

* * * * *